Sept. 22, 1925.

W. R. BELDAM

HOT WATER BOTTLE

Filed Aug. 23, 1924

1,554,397

Inventor:
William Robert Beldam,
by Byrnes, Stebbins & Parmelee,
Attys.

Patented Sept. 22, 1925.

1,554,397

UNITED STATES PATENT OFFICE.

WILLIAM ROBERT BELDAM, OF LONDON, ENGLAND.

HOT-WATER BOTTLE.

Application filed August 23, 1924. Serial No. 733,829.

*To all whom it may concern:*

Be it known that I, WILLIAM ROBERT BELDAM, a subject of the King of England, residing at London, England, have invented certain new and useful Improvements in Hot-Water Bottles, of which the following is a specification.

This invention is for improvements in or relating to hot-water bottles particularly of the type that are made of flexible material, such as rubber, and has for its object to provide means whereby such bottles may be automatically preserved from destruction when filling them with boiling water.

As is known, rubber hot-water bottles, when filled with boiling water, quickly deteriorate. If they are filled with water which is not boiling it is difficult to regulate exactly the temperature, with the result that the bottles are liable to be insufficiently hot, and persons can not be depended upon to first boil the water and then slightly cool it, as by pouring it into a jug prior to filling the bottle.

According to the present invention, a hot-water bottle of the above type is characterized in that the outlet is so positioned or so formed that the contents of the bottle can not ordinarily (e. g. by tipping the bottle or disposing it vertically with the outlet directed downwardly) be entirely emptied through the outlet. An additional advantage of this construction is that the bottle can not be filled unduly full.

When a bottle is refilled the water in it is usually cold and thus it will be seen that by arranging the outlet as above set forth, a sufficient quantity of cold water will be permanently retained in the bottle so that when filling with boiling water the hot-water will be instantly chilled by contact with the cold water already in the bottle to an extent sufficient to prevent damage to the bottle, but without any unnecessary cooling of the hot-water.

The outlet may be so positioned that its inner end is situated below the level of some part of the interior of the bottle when the bottle is disposed vertically with its outlet directed upwardly. With the outlet positioned in this manner the water will only flow out of the bottle, when the bottle is inverted, so long as the level of the water is above the inner end of the outlet. What remains below this level will be retained in the bottle for chilling the next charge of boiling water.

Alternatively, the outlet may be formed in such manner that its inner end is situated below the level of some part of the interior of the bottle when the bottle is disposed vertically with its outlet directed upwardly.

The accompanying drawing illustrates the invention by way of example as applied to an india rubber hot-water bottle.

Figure 1:
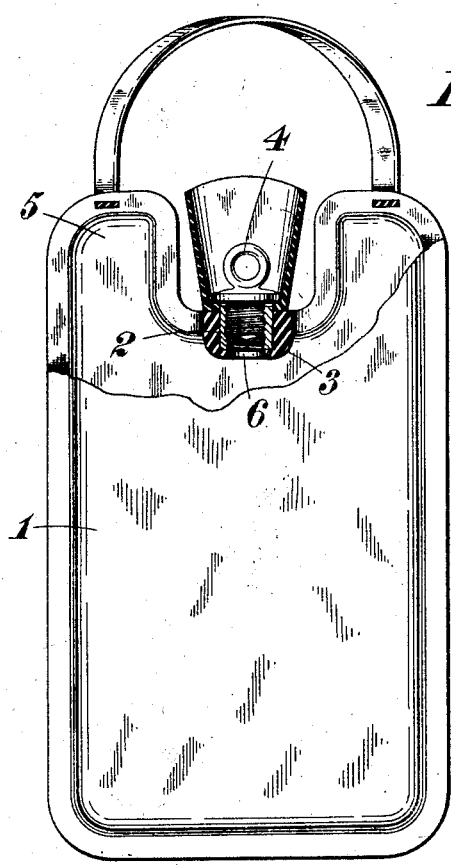
Figure 2:
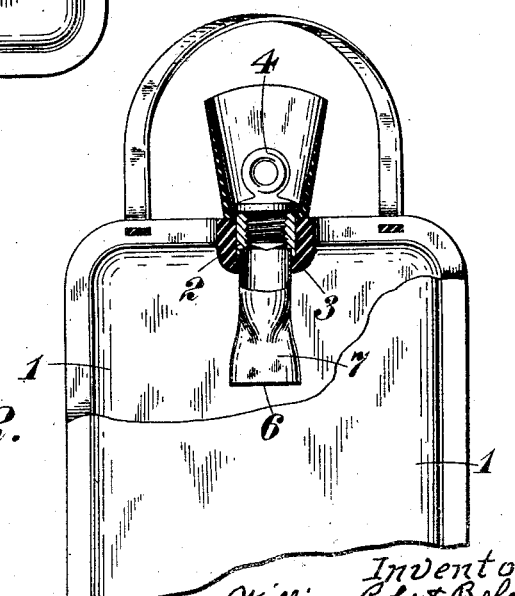

Figure 1 illustrates one form of the invention,

Figure 2 another form, and

Figure 3:
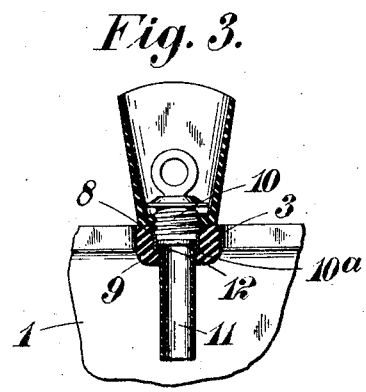

Figure 3 another form still.

Like reference characters indicate like parts in the various figures.

Referring first to the form of bottle shown in Figure 1, this bottle comprises a rubber body 1 constructed, in general, in the manner customary for hot-water bottles of this class. The bottle is provided with an outlet at its upper end which is so situated that its inner end is below the interior of the bottle at the top thereof. This outlet comprises, in the usual way, a socket 2 vulcanized into a rubber boss 3 formed on the upper end of the bottle, and a screw stopper 4. As will be seen from the drawing, the outlet is so positioned that a part 5 of the interior of the bottle extends above the inner end 6 of the outlet. If the bottle be inverted with water contained within it the level of the water will not descend below the inner end 6 of the outlet and the part 5 of the interior of the bottle will contain a certain amount of water after the main portion of the water has been emptied.

Referring next to the form illustrated in Figure 2, the difference between this form and that previously described is that the outlet of the bottle is situated in the position usual in such bottles and is provided with an extension 7 which projects into the interior of the bottle. This extension may either form part of the sleeve 2 or it may be introduced into the inner end of this sleeve. The extension 7 may be flattened at its lower end so as to conform to the sides of the bottle.

The bottle shown in Figure 3 will now be referred to. The bottle is of rubber and of the ordinary shape and construction. It is provided with a known form of stopper comprising a socket 8 with a circumferential ledge 9, and a stopper 10. The stopper is faced at its inner end with a rubber washer 10ª which bears upon the ledge 9 and effects a watertight seal therewith.

Introduced into the bottle through the socket 8 so as to project into the interior of the bottle therefrom is a tubular extension 11, e. g. of metal. This extension has a circumferential projection 12 at the upper end, which is engaged at its periphery by the screw thread of the socket. It is engaged also on its upper face by the bottom of the stopper and thereby clamped down upon the aforesaid ledge.

Obviously, the invention is not restricted to rubber bottles only, as it could be applied to bottles made of other flexible materials which might become damaged by boiling water, such as rubbered fabric. Also, that feature of the invention which comprises the provision of an extension in, or for use with, a hot-water bottle is not restricted to bottles as above described, having a stopper which screws down on to a ledge, but it is applicable to any form of bottle.

I claim:—

1. A hot-water bottle comprising in combination a reservoir for the hot water, a stoppered inlet and outlet opening in the wall of the reservoir, and a removable tubular extension from the opening which projects into the interior of the reservoir so as to extend from the opening to a point within the reservoir so positioned as to lie below some part of the interior of the reservoir when the bottle is disposed with the aforesaid opening uppermost.

2. A hot-water bottle of the collapsible type comprising in combination a flexible water-containing envelope, a screw-stoppered inlet and outlet opening in one end of the envelope, and a tubular extension from the said opening, which tubular extension is retained at one end in the aforesaid opening by resilient engagement therewith and projects from the opening into the interior of the envelope, substantially as and for the purpose described.

3. A hot-water bottle of the collapsible type comprising in combination a water-containing envelope, a screw-stopper socket in one end of the envelope provided at its inner end with a circumferential ledge which projects inwardly from the wall of the socket towards the central axis thereof, a screw-stopper to co-operate with the socket and screw into it towards the aforesaid ledge, and a tubular extension which projects from the socket into the interior of the envelope and is provided with a shoulder which is clamped between the aforesaid ledge and the inner end of the stopper when the latter is screwed home, substantially as and for the purpose described.

4. A hot-water bottle of the collapsible type comprising in combination a water-containing envelope, a screw-stopper socket in one end of the envelope provided at its inner end with a circumferential ledge which projects inwardly from the wall of the socket towards the central axis thereof, a screw-stopper to co-operate with the socket and screw into it towards the aforesaid ledge, and a tubular extension which projects from the socket into the interior of the envelope and is provided with a shoulder which is clamped between the aforesaid ledge and the inner end of the stopper when the stopper is screwed home and is, moreover, retained in position when the stopper is removed by resilient engagement of the peripheral edge of said shoulder with the screw-threads of the socket, substantially as described.

In testimony whereof I have signed my name to this specification.

WILLIAM ROBERT BELDAM.